United States Patent [19]

Dunwoody

[11] Patent Number: 4,649,954
[45] Date of Patent: Mar. 17, 1987

[54] LAWN CADDIE

[76] Inventor: Rex J. Dunwoody, 14841 S. 92nd St., N., Owasso, Okla. 74055

[21] Appl. No.: 768,104

[22] Filed: Aug. 21, 1985

[51] Int. Cl.$^4$ .............................................. A62C 35/00
[52] U.S. Cl. .......................... 137/355.17; 137/355.27; 242/86.5 R; 242/54 R
[58] Field of Search .................. 242/99, 86.5 R, 54 R; 137/355.27, 355.17

[56] References Cited

U.S. PATENT DOCUMENTS

| | | | |
|---|---|---|---|
| 1,940,051 | 12/1933 | Heath | 242/86.5 R |
| 2,215,651 | 9/1940 | Pierce | 242/86.5 R |
| 2,368,293 | 1/1945 | Garoncher | 137/355.17 |
| 2,958,478 | 11/1960 | Petersen et al. | 242/86.5 R |
| 3,134,555 | 5/1964 | Baker | 242/86.5 R |
| 3,148,561 | 9/1964 | Schlenz | 242/54 R |
| 3,517,695 | 6/1970 | Eveleigh et al. | 137/355.17 |
| 3,766,966 | 10/1973 | Moody et al. | 137/355.17 |
| 3,876,045 | 4/1975 | Knarreborg | 242/54 R |
| 3,934,854 | 1/1976 | Goode | 242/86.5 R |
| 4,454,999 | 6/1984 | Woodruff | 242/86.5 R |

Primary Examiner—A. Michael Chambers
Attorney, Agent, or Firm—Head, Johnson, Stevenson

[57] ABSTRACT

Multi-reels axially aligned for holding electrical cable and for holding water hoses. Two reels are for electric wire and two are for water hoses and any one of the reels can be rotated independently of the other reels. A first electric cord wound on one reel is electrically connectible to a second electrical cord wound on the second electrical reel. Likewise, a first water hose wound on the first water reel is connectible to a second water hose wound on the second hose reel.

1 Claim, 10 Drawing Figures

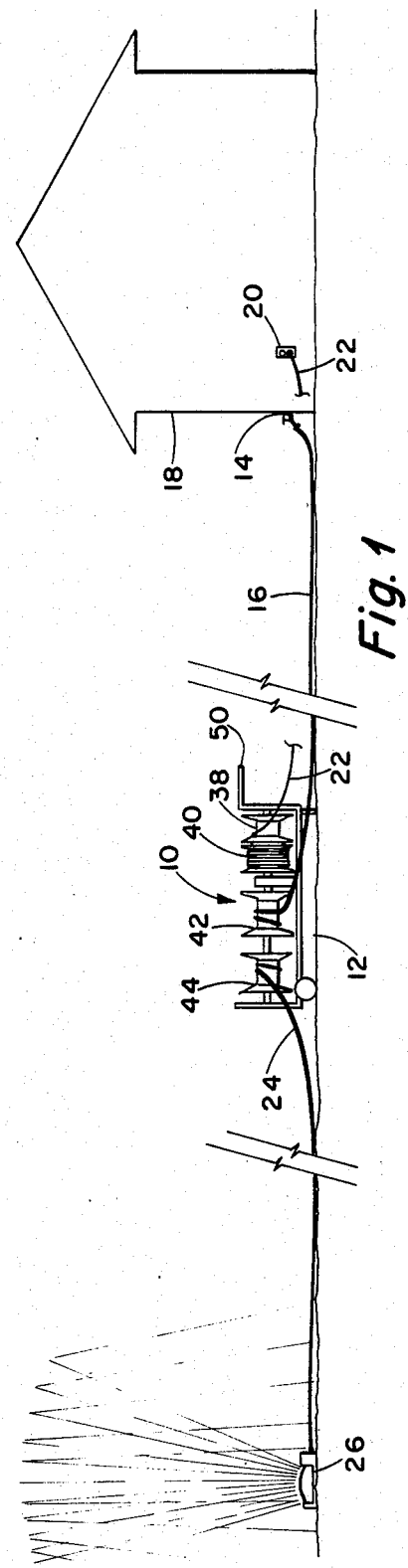
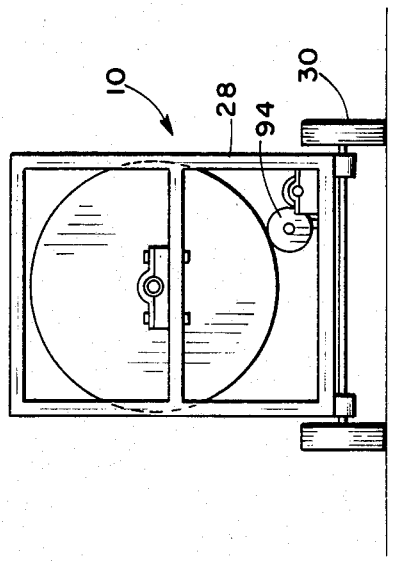
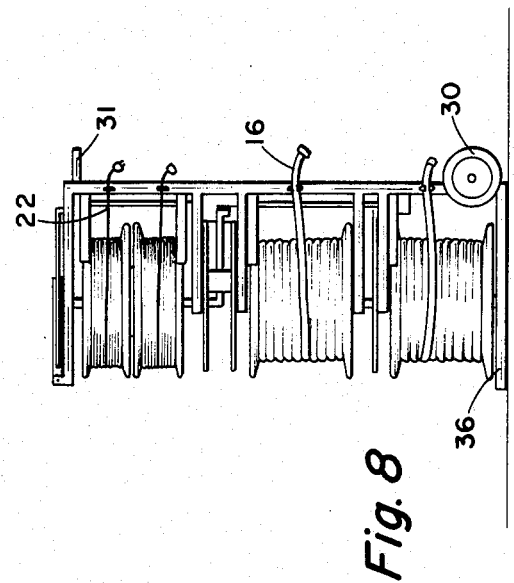

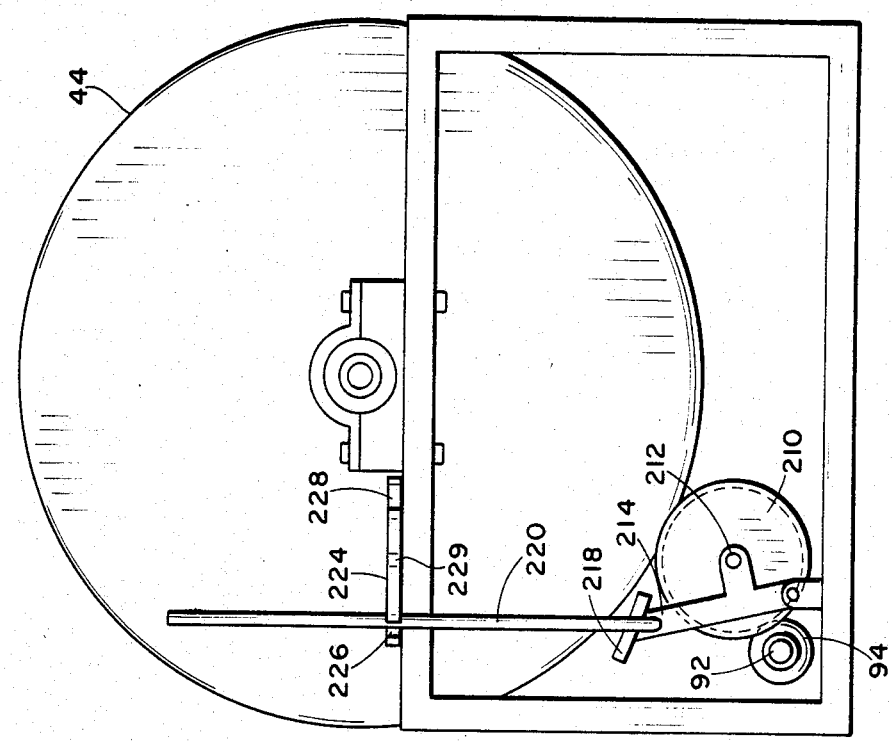
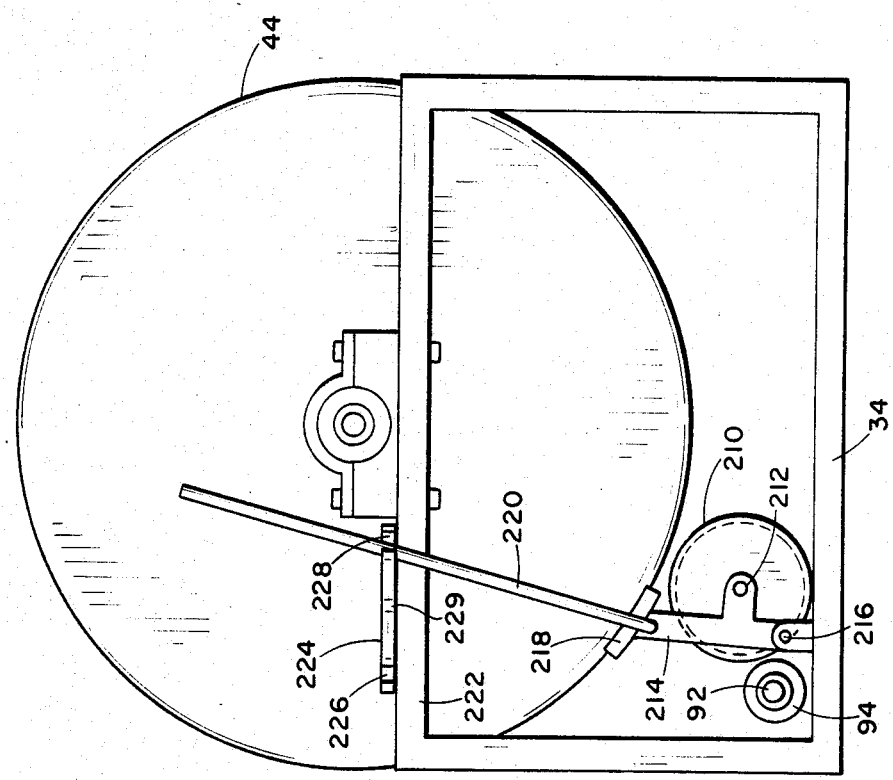

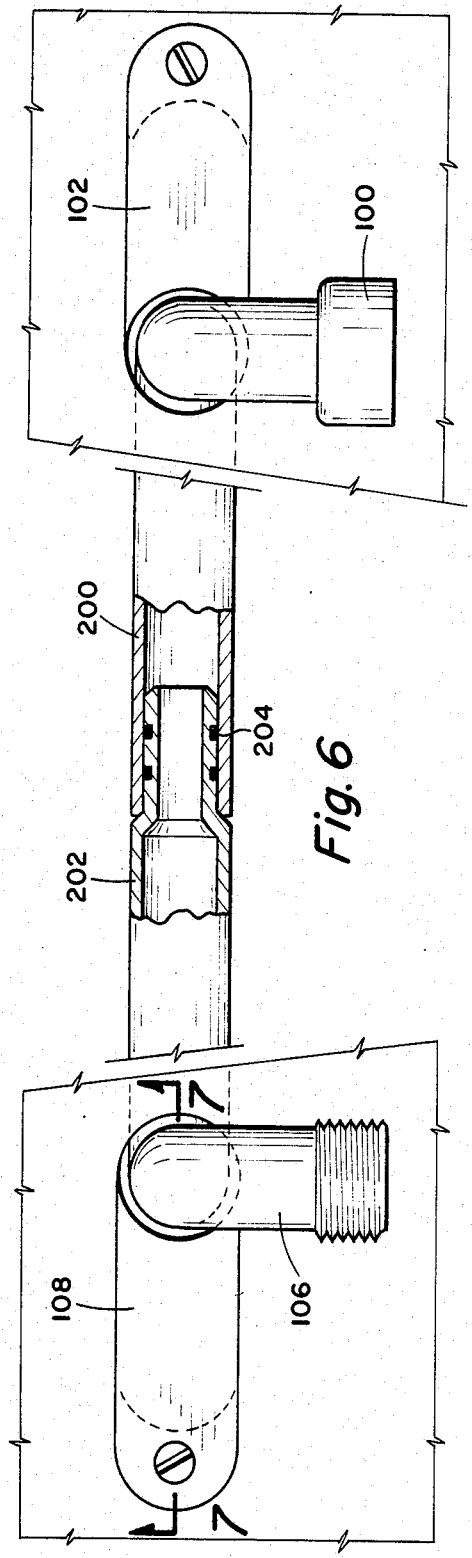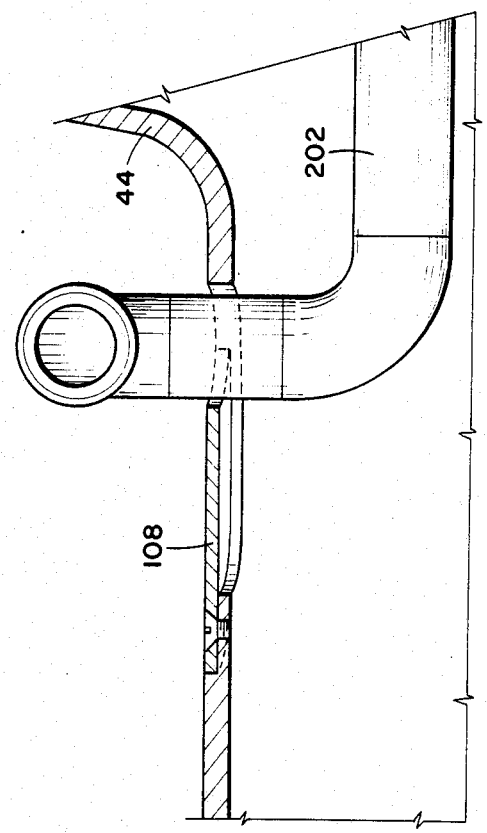

LAWN CADDIE

BACKGROUND OF THE INVENTION

This relates to multi-reels for storing electric cords and garden water hoses.

In caring for lawns, shrubbery and so forth, one nearly always needs to use a garden water hose and an electrical cord. These electrical cords and water hoses are quite common around most homes in this country. However, most people find it troublesome to properly care for their electric cords and garden hoses. Many times they are just sort of thrown over in the corner of the garden or the garage in a not too neat pile. Other times, people go to the trouble to hand roll them. There are even reels which may be hand operated or even motor driven upon which to wind a hose. However, to my knowledge, none has an assemble upon which both the electrical cord and the garden hose can be wound. A search has revealed the following reel related U.S. Pat. Nos. 677,993; 2,312,528; 2,573,868; 2,621,870; 2,625,344; 2,735,717; 4,117,991; and 4,366,933.

SUMMARY OF THE INVENTION

This reel assembly has two axially aligned electric cord reels and two garden water hose axially aligned reels. One power source is provided and means are such that any one or all reels or any number in between can be rotated at any one time. A separate brake means is provided for each of the reels. Means are also provided for connecting the cord on one electric cord reel to the cord on another electric cord reel by using circuit boards and contact rings. Motor contacts are also provided for taking off power to apply to an electric motor for driving all the reels.

Means are provided to connect the hose on one garden hose reel to the hose on another reel, whether one reel is turning in relation to the other or not. Brake means are also provided individually for each reel. All the reels are mounted on a frame assembly which has front wheels mounted on the frame and a rear fold down handle for pushing the device about. The assembly can be stored on its end to take less space in a garage.

It is thus an object of my invention to provide a multi-reel assembly so that there are at least two reels for an electric cord and at least two reels for a garden water hose and means to wind or unreel each reel independently of the others.

BRIEF DESCRIPTION OF THE DRAWINGS

FIG. 1 shows my reel assembly in use between a utility building and a lawn sprinkler.

FIG. 3 is a view taken along the line 3—3 of FIG. 2.

FIG. 4 shows the brake and drive assembly in the braking position.

FIG. 5 is similar to FIG. 4 except the brake and drive assembly is in the drive position.

FIG. 6 shows a double O-ring seal connection between the two water hose reels.

FIG. 7 is a view taken along the line 7—7 of FIG. 6.

FIG. 8 shows the reel assembly positioned on its end for storage.

DETAILED DESCRIPTION OF THE PREFERRED EMBODIMENT

Figure 2:
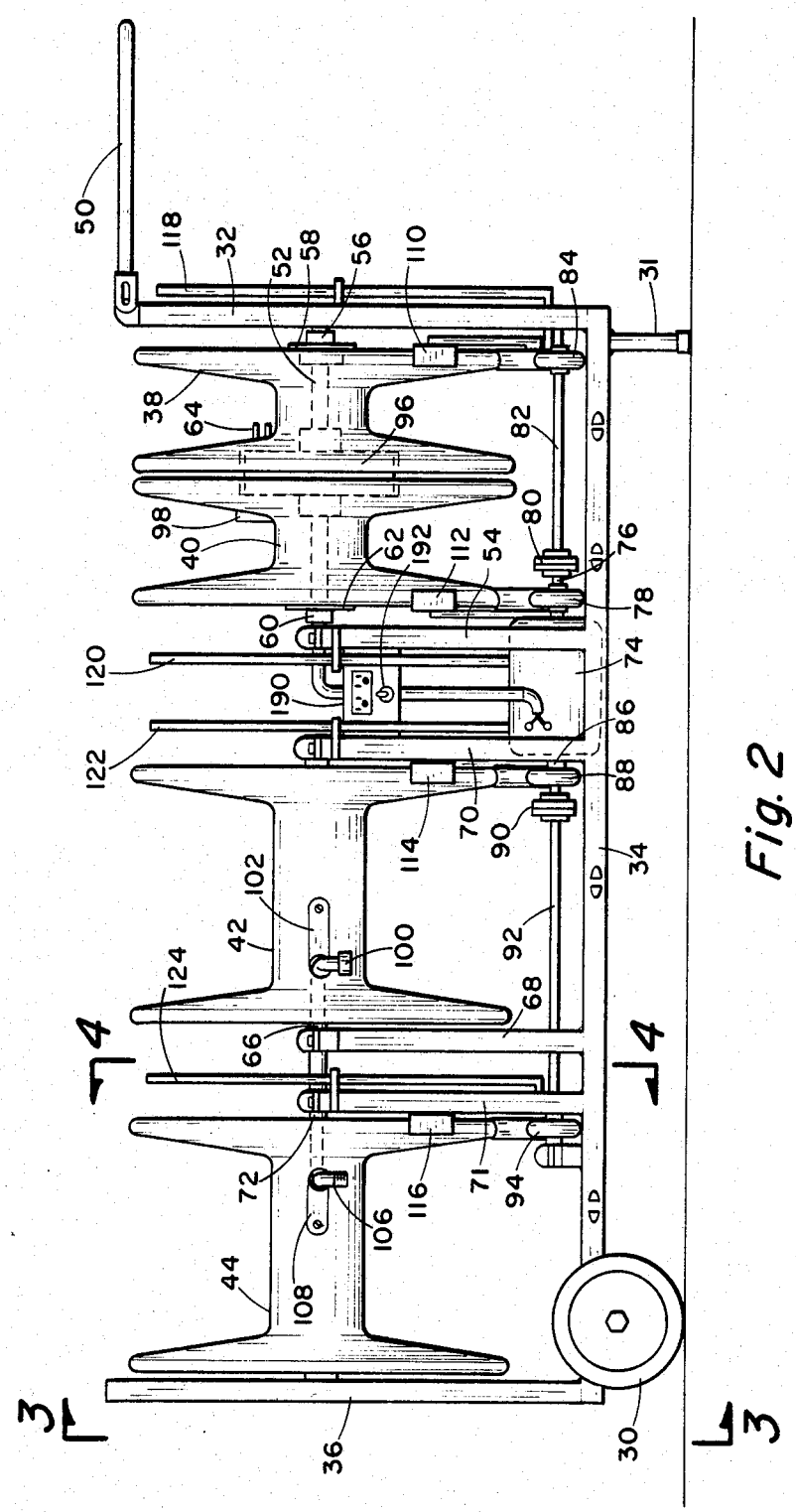
FIG. 2 shows an enlarged view of my reel assembly shown without electrical cords and water hoses.

Attention is first directed to FIG. 1 which shows my reel assembly 10 positioned on a lawn 12 between a utility building 18 and a sprinkler 26. There is shown a first and second electrical cord reel 38 and 40 which are axially aligned in a first garden water hose reel 42 and a second garden water hose reel 44 which are also axially aligned. An electric cord 22 extends from reels 38 to outlet socket 20 on utility building 18. Likewise, garden hose 16 is connected to a water tap 14 on the utility building 18 and extends to first garden water hose reel 42.

Attention is next directed to FIG. 2 which shows the reel assembly without the cord and/or hose mounted thereon. The reels are all supported from a frame assembly including rear frame assembly 32, bottom frame assembly 34 and end frame assembly 36. A lower frame assembly 34 is supported by wheels 30 at one end and at the rear end by a stand or rod 31. The upper end of rear frame assembly 32 is provided with a fold down handle 50. Reels 38 and 40 are rotatably mounted on shaft 52. Thus, reel 38, can rotate independently of reel 40. Shaft 52 is supported at one end from rear frame assembly 32 and at the other end by axle support 54 which is supported from bottom frame assembly 34. Axle clamp 56 and wear ring 58 is provided on shaft 52 at the rear frame assembly 32 and an axle clamp 60 and wear ring 62 is provided adjacent the axle support 54. A male electric fitting 64 is provided on electric reel 38.

A first garden hose reel 42 is mounted on a axle 66 supported between reel supports 68 and 70 which are each supported from bottom frame assembly 34. Second garden hose reel 44 is supported on axle 72 which is supported from axle support 71 which in turn is supported by bottom frame assembly 34. The other end of axle 72 is supported from end frame assembly 36.

A drive moror 74 is supported from bottom frame support assembly 34. The motor 74 is connected to shaft 76 which supports reel drive gear 78. Axle 76 is connected through universal joint 80 to drive shaft 82 which is connected to reel drive gear or wheel 84. The other end of the shaft of the motor 74 is connected to shaft 86 to reel drive gear or wheel 88. Axle 86 is connected through a universal joint 90 to a second drive shaft 92 which is connected to drive gear 94.

Figure 10:
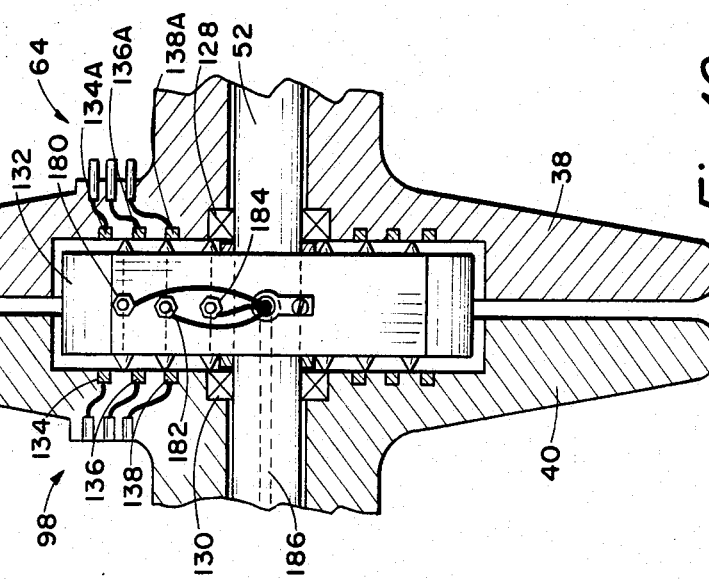
FIG. 10 is a view taken along the line 10—10 of FIG. 9.
Figure 9:
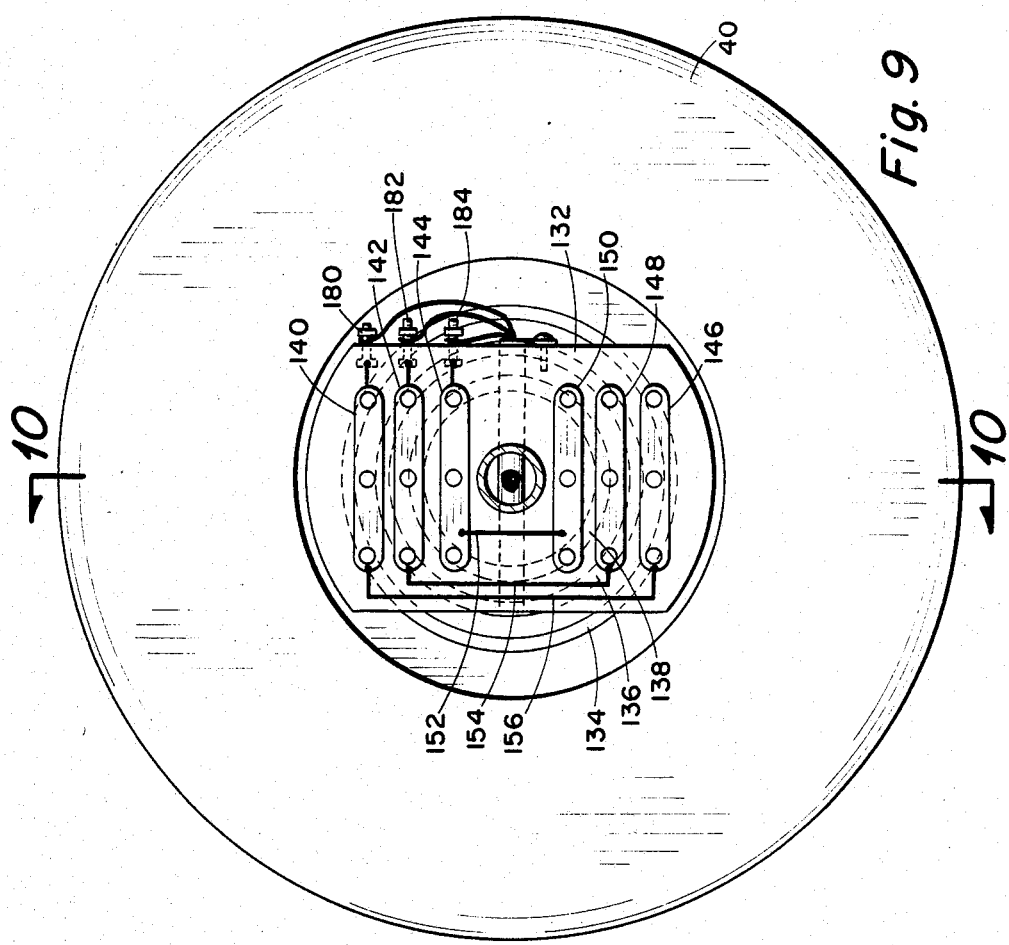
FIG. 9 shows a side view of one of the electrical reels contact rings and a circuit board.

There are means for connecting the male plug 64 to the electric cord wound on reel 40 and the means includes contact rings, motor contact and circuit board generally indicated at 96 and which will be more fully explained in regard to FIGS. 9 and 10. Reel 40 also has a female socket outlet 98.

Likewise, there are means for connecting the hose which will be wound on hose reel 42 to the hose to be wound on reel 44. This includes a female hose connection 100 on anchor plug 102 of hose reel 42 and a connecting conduit inside the axle which connects to a male hose connection 106 which is supported by anchor plug 108. This assembly will be shown more clearly in FIGS. 6 and 7. There is a brake 110, 112, 114, and 116 respectively for reels 38, 40, 42, and 44. There is a handle 118, 120, 122, and 124 for each reel and break assembly respectively for reels 38, 40, 42 and 44. These will be shown in more detail in FIGS. 4 and 5.

Attention is next directed to FIGS. 9 and 10 which shows the electrical connections between reels 38 and 40. Reels 38 and 40 are supported from shaft 52 by bearings 128 and 130 respectively. As shown in FIG. 9, reel 40 is provided with a circuit board 132 which has contact bars 140, 142 and 144 at the top and contact bars 146, 148 and 150 at the bottom. Bars 150 and 144 are connected by electric conduit 152; contact bars 142 and 148 are connected by electric conduit 154 and contact bars 140 and 146 are connected by electric conduit 156. The reel is provided with contact rings 134, 136 and 138. Each contact bar is shown rivited at the center to the circuit board and has contact points at the end thereof for contacting its respective contact rings. These contact rings are connectd to outlet plug 98. The use of contact rings and contact points on a circuit board is well known and is not believed any further discussion needs to be had. The three contact rings are, of course, one for the positive, one for the negative and one for the ground. Each side of the circuit board 132 is provided with the contact bars similar to contact bars 140, 142, 144, 146, 148 and 150 as shown in FIG. 9 so that each reel 38 and 40 is provided with such contact bars. The circuit board 132 as shown in FIG. 10 is supported from shaft 52 and does not rotate with the reels 38 and 40. The contact bars are secured through the reels and rotate therewith. Reel 38 is provided with contact rings 134A, 136A and 138A which are similar to contact rings 134, 136 and 138. These contact rings 134A, 136A and 138A are connected to the male electrical socket 64. There are motor contacts 180, 182 and 184 which are connected to conduits which extends through passage 186 to control box 190 which has switch 192 to turn motor 74 off and on.

Attention is next directed to FIGS. 6 and 7 which shows the connection for hooking up a hose on hose reel 42 to a second hose on hose reel 44. A female connection 100 is provided for attaching to the male end of an ordinary garden hose. This connection 100 is in fluid communication with the conduit 200 which is rotatably and sealingly connected to a second conduit 202 by double O-ring seals 204. Conduit 202 connects to male outlet 106.

Attention is next directed to FIGS. 4 and 5 which illustrates the reel drive and brake assembly which is individually supplied for each of the reels 38, 40, 42 and 44. This will be described in relation to reel 44 but a similar system is supplied for each of the reels. Shown thereon is a reel 44 which in FIG. 4 is in a braking position and cannot rotate, whereas in FIG. 5 it is in a drive position and the brake has been released. Shown thereon is a reel drive gear 94 mounted on shaft 92. An idle gear 210 is mounted on pivot 212 on pivot arm 214 which is pivoted from frame 34 by pivot 216. A brake shoe 218 is provided at the upper end of member 214. The upper end of member 214 is connected to a reel drive lever 220. The top of the frame is provided with a frame top 222 which has a reel drive lever guide 224 which has a drive control notch 226 and a brake control notch 228. When the reel drive lever 220 is in the brake control notch 228, brake 218 is in contact with reel 44 and at that time, idle gear 210 is out of contact with reel drive gear 94. Therefore, the reel 44 is held in a fixed position. When it is desired to drive reel 44, all that is necessary to do is to move the reel drive lever 220 from the brake control notch to the drive control notch 226 as shown in FIG. 5. At this point, the brake shoe 218 has been removed from the reel and idle gear 94 is in contact with reel drive gear 94 and with the reel 44. Thus, the brake is released and the rotation of the reel drive gear 94 causes the reel 44 to be driven. A neutral notch 229 is provided in lever guide 224. When lever 220 is in this neutral notch, the reel is free to roll by hand as the brake is released and idle gear 210 is not in contact with the reel.

The reel assembly which I have just described is designed to minimize the workload for the gardener, lawn tender, contractor or anyone who uses and stores garden hoses and electrical cords. It may hold up to 400 feet or more of garden hose and up to 400 feet or more of electrical cord. Either the garden hose or electric cords are stored in a manner on the reel so that the user can unwind a few feet or all that is needed and then restore them on individual reels with little effort. Gone are the unsightly rolls, tangles and common abuse of the lawn and garden equipment. Each of the reels are independently driven with hand control levers for safe, easy operation. My invention eliminates the word and frustration of a hand crank and gives the user a free hand to guide the hoses and cords neatly onto the reels. A grip may be provided to secure the tail end of the hoses and cords. The brake, which I can set for each reel, keeps the hose and cords from becoming loose and tangled. I can also put the reel drive lever in a neutral position in a notch 229 to allow any part or all of the hoses and cords to be removed as they are needed. A reel assembly can also be stored easily in a small place by turning it on its end as shown in FIG. 8. My reel assembly may be rolled to the job site on the wheels 30 by using handle 50. When its to the job site the hose with the female end 100 may be unrolled from reel 42 after the brake or reel lever 124 is put in the neutral position and extended to the nearest water hydrant 14. The male end may be extended from the other reel 44 as needed with the lever 124 in the neutral position. When it has been extended to the extend that it wishes the lever 124 can be put in the brake position. At the same time the electrical cord with the male connector may be extended from one reel to the nearest power outlet 20 and the cord with the female connector from reel 40 may be extended as needed. Power is transmitted from the cord on one reel to the cord on the other reel. Electrical power is also connected to drive motor 74 when switch 192 is turned on.

When the job is finished, without having to move the reel assembly, the water hose may be disconnected from the faucet and all water hoses may be placed neatly and easily back on the power driven reels. Once in place, the levers 124 for the two water hose reels are placed in the brake position and this disengages the reels from the drive shaft. Also at this time, all electrical cords may be wound back on the reels except for that part of the cord which extends from reel 38 to outlet 20 which is the primary power source. The reel assembly may then be moved as closely as possible to the power source and the last part of the electrical cord may then be power wound onto the reel 38. Then the last brake is set and the reel assembly is then ready for storage and is easily accessible for the next job.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. A reel assembly upon which a plurality of water hoses and electrical cords each having a female and male connection comprising:
   a frame;
   a first electrical cord reel;
   a second electrical cord reel;
   first support means for supporting said first and second electrical cord reel from said frame in a substantially axial alignment;
   a first water hose reel;
   a second water hose reel;
   second support means supporting from said frame, said first and second water hose reels in a substantially axially alignment, all said reels being in substantial axial alignment;
   an electric drive motor supported by said frame;
   a first drive shaft and a second drive shaft connected to be rotated by said electric motor and supported from said frame;
   said first drive shaft having a first and second reel drive gears aligned with the periphery of one side of each of said electrical cord reels;
   a second drive shaft having a hose reel drive gear aligned with the periphery of the circumference of each of said water hose reels;
   an idle gear for each said reel drive gear;
   a lever means for each said idle gear;
   a brake pad mounted on each said lever;
   a reel drive lever guide supported from said frame and having a drive notch, a neutral notch and a brake notch for said reel drive lever and arranged so that when said reel drive lever is in said drive notch, said idle gear contacts both said reel drive gear and said reel and when in the brake notch, said brake pad is in contact with said reel and said idle gear is not in contact with said reel and when said reel drive lever is in said neutral notch, then neither said pad nor said idle gear is in contact with said reel;
   at least three contact rings on each of the adjacent places of the connector cord reels;
   a circuit board carried between said electrical cord reels by said first support means;
   said circuit board having at least three contact bars on each side thereof for contacting the contact rings of each said reel;
   a male outlet on the interior of one reel connected to each of said contact rings;
   a female electrical outlet on the other of said reel and connected to the contact rings thereon;
   a water conduit connection in each of said water hose reels;
   conduit means rotatably connecting each said water connection means;
   a first water conduit having one end terminating in a water connection on said first water has reel;
   a second water conduit having one end terminating in a water connection on said second water hose reel;
   sealing means rotatably connecting said first and second water conduits.

* * * * *